(12) United States Patent  
Marble

(10) Patent No.: US 10,035,400 B2
(45) Date of Patent: Jul. 31, 2018

(54) VEHICLE SUSPENSION SYSTEM

(71) Applicant: GM GLOBAL TECHNOLOGY OPERATIONS LLC, Detroit, MI (US)

(72) Inventor: Robert P. Marble, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 106 days.

(21) Appl. No.: 15/220,637

(22) Filed: Jul. 27, 2016

(65) Prior Publication Data

US 2018/0029433 A1 Feb. 1, 2018

(51) Int. Cl.
*B60G 17/02* (2006.01)
*B60G 11/00* (2006.01)

(52) U.S. Cl.
CPC ............ *B60G 17/02* (2013.01); *B60G 11/00* (2013.01); *B60G 2200/144* (2013.01); *B60G 2206/42* (2013.01); *B60G 2500/20* (2013.01); *B60G 2500/30* (2013.01)

(58) Field of Classification Search
CPC .... B60G 17/02; B60G 11/00; B60G 2500/20; B60G 2206/42; B60G 2500/30; B60G 2200/144
See application file for complete search history.

(56) References Cited

U.S. PATENT DOCUMENTS

| | | | | |
|---|---|---|---|---|
| 3,563,566 A * | 2/1971 | Weber | ................. | B60G 21/073 267/186 |
| 5,263,736 A * | 11/1993 | Stevens | ................... | B60G 3/14 267/273 |
| 6,024,366 A * | 2/2000 | Masamura | ......... | B60G 17/0416 267/217 |
| 6,267,387 B1 * | 7/2001 | Weiss | ....................... | B60G 3/26 280/124.106 |
| 8,434,771 B2 * | 5/2013 | Yu | ....................... | B60G 17/0162 188/266.2 |
| 9,090,141 B2 * | 7/2015 | Schmidt | ............. | B60G 17/0272 |
| 2006/0175776 A1 * | 8/2006 | Christophel | ....... | B60G 17/0157 280/6.157 |
| 2009/0302559 A1 * | 12/2009 | Doerfel | ................ | B60G 15/065 280/5.519 |
| 2011/0025000 A1 * | 2/2011 | Inoue | .................. | B60G 17/0157 280/5.507 |

(Continued)

*Primary Examiner* — Darlene P Condra
(74) *Attorney, Agent, or Firm* — Quinn IP Law

(57) ABSTRACT

A vehicle includes a vehicle body having a structure and a wheel maintaining contact with a road surface. A suspension supports the structure and includes one or more suspension corner assemblies connecting the wheel to the structure and configured to maintain contact between the wheel and the road surface. A secondary actuation system cooperates with the suspension system and is operable to selectively change at least one vehicle operating property. The secondary actuation system includes at least one actuator device operatively connected to the structure at a first end and the one or more suspension corner assemblies at a second end to selectively change at least one vehicle operating property and a spring assembly in fluid communication with the at least one actuator device selectively actuated to adjust an amount of fluid in the at least one actuator device to selectively change the at least one vehicle operating property.

15 Claims, 3 Drawing Sheets

(56) References Cited

U.S. PATENT DOCUMENTS

| | | | | |
|---|---|---|---|---|
| 2013/0161138 A1* | 6/2013 | Barefoot | ............... | F16F 9/34 |
| | | | | 188/282.1 |
| 2015/0375592 A1* | 12/2015 | Lannen | ............... | B60G 17/016 |
| | | | | 701/37 |
| 2016/0016451 A1* | 1/2016 | Izak | ............... | B60G 17/00 |
| | | | | 280/5.503 |
| 2016/0059664 A1* | 3/2016 | Tucker | ............... | B60G 17/04 |
| | | | | 280/124.159 |
| 2016/0200162 A1* | 7/2016 | Luczak | ............... | B60G 15/065 |
| | | | | 280/6.157 |
| 2017/0015174 A1* | 1/2017 | Ruppert | ............... | B60G 17/0525 |
| 2017/0291465 A1* | 10/2017 | Christoff | ............... | B60G 15/10 |

\* cited by examiner

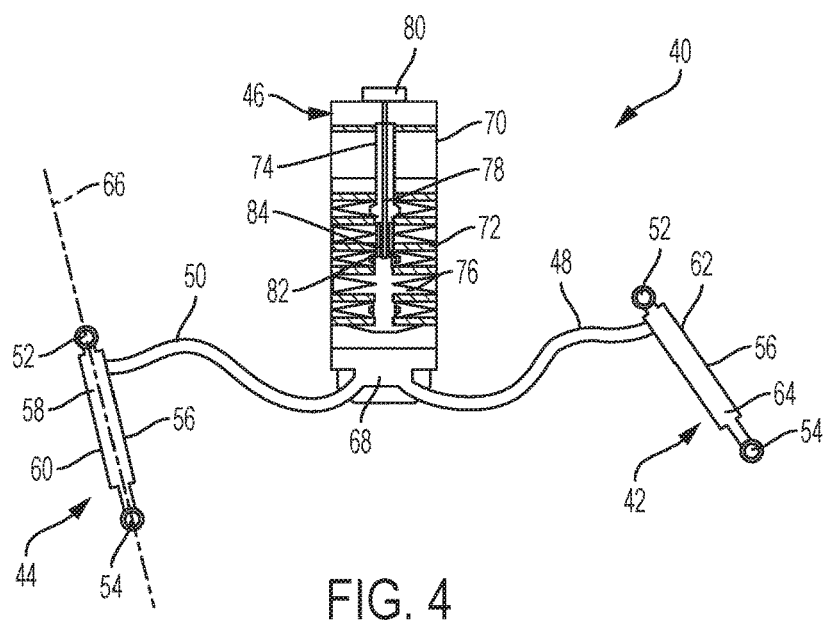
FIG. 4
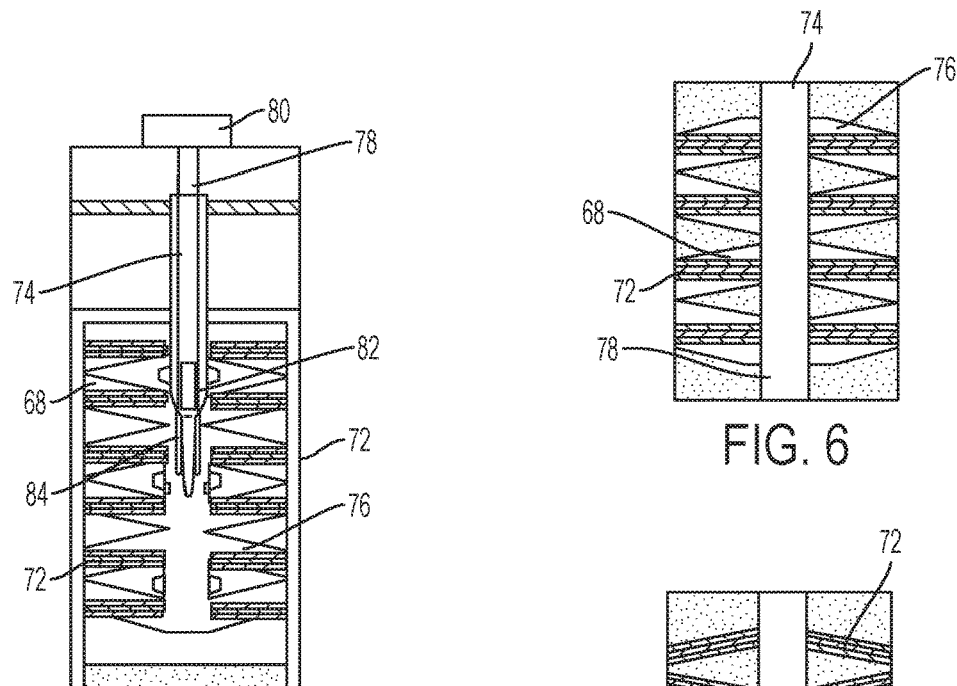
FIG. 5
FIG. 6
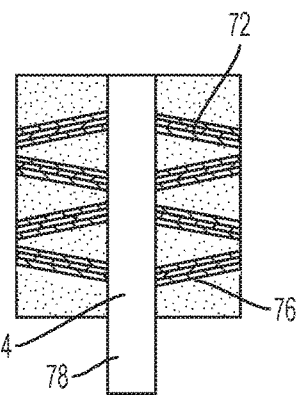
FIG. 7

VEHICLE SUSPENSION SYSTEM

TECHNICAL FIELD

The present disclosure relates to a vehicle suspension system, and more particularly, to a secondary actuation system for the vehicle suspension system.

BACKGROUND

Vehicles typically employ suspension systems that generally include a system of springs, dampers, also known as shock absorbers, and linkages that connect a vehicle body to the vehicle's wheels. The majority of forces acting on the vehicle body are transmitted through contact patches between the road and the tires. One of the main objectives of a vehicle suspension is to maintain the contact between the vehicle's road wheels and the road surface and dampen movement of a sprung mass of the vehicle which provides a smoother ride. Additionally, the design of the suspension also influences the height of the vehicle body relative to the road surface.

Vehicle suspension systems generally contribute to the vehicle's road-holding/handling and braking, as well as provide comfort and reasonable isolation from road noise, bumps, and vibrations to the vehicle occupants. Because these objectives are generally at odds, the tuning of suspensions involves finding a compromise that is appropriate to each vehicle's intended purpose. Some suspension systems are passive, so that preload, spring rate, and ride height of the vehicle are nonadjustable, single predetermined values determined by the design of the damper assembly. In some systems, preload, spring rate, and ride height are variable, but not all in a controlled manner. Other suspension systems are actively controlled, so that the spring rate or the preload of the vehicle can be varied.

SUMMARY

A vehicle includes a vehicle body having a structure and a wheel maintaining contact with a road surface. A suspension system supports the vehicle structure and includes at least one suspension corner assembly connecting the wheel to the structure and configured to maintain contact between the wheel and the road surface. A secondary actuation system cooperates with the suspension system and is operable to selectively change at least one vehicle operating property.

The secondary actuation system includes at least one actuator device operatively connected to the structure at a first end and the at least one suspension corner assembly at a second end to selectively change at least one vehicle operating property. A spring assembly is in fluid communication with the at least one actuator device and is selectively actuated to adjust an amount of fluid in the at least one actuator device to selectively change the at least one vehicle operating property.

The at least one suspension corner assembly further comprises a knuckle configured to support the wheel operatively connected to the structure via at least a first suspension link, a second suspension link and a damper assembly operatively connected to the knuckle and the structure to dampen forces generated at the wheel as the vehicle traverses the road surface. The at least one actuator device defines a chamber receiving the fluid and a piston disposed inside the chamber to divide the chamber into a first chamber portion and a second chamber portion. The piston is selectively movable inside the chamber along an axis to selectively change the at least one vehicle operating property.

The at least one actuator device further comprises a rod having a first end attached to the piston and extending from the first end of the chamber and a second end securable to a portion of the structure. The spring assembly further comprises a housing, at least one resilient member disposed within the housing adjustable between a first position and one or more second positions and one or more channels formed within the housing cooperating with the at least one resilient member. A preload mechanism extends through the one or more channels and operably connects to the plurality of shim discs to selectively adjust the at least one resilient member between the first position and one or more second positions to change the at least one vehicle operating property.

The at least one resilient member further comprises a plurality of shim discs disposed in the spring assembly housing as a series of spaced apart stacks of shim discs and formed with a shallow conical taper to provide precise tolerance for suspension adjustment rate control. The at least one resilient member may also comprise a spring medium including but not limited to coil spring, a wave spring, an accordion spring, a pneumatic spring and an elastomeric member. The adjustable at least one vehicle operating property is selected from the group consisting of variable rate stiffness, preload ride height and preload compensation of load of the spring assembly.

The one or more channels in the spring assembly housing further comprises a first channel centrally located in and extending at least partially through an interior of the spring assembly housing to receive the preload mechanism and a second channel arrangement configured to cooperate and receive the at least one resilient member when the at least one resilient member is adjusted to the one or more second positions. A locking mechanism cooperates with and engages the at least one resilient member to create an increased rate in the secondary actuation system by locking out part of the at least one resilient member.

In another embodiment of the disclosure, a suspension system for a vehicle having a structure and a wheel configured to maintain contact with a road surface comprises at least one suspension corner assembly connecting the wheel to the structure and configured to maintain contact between the wheel and the road surface. A secondary actuation system cooperates with the suspension system and is operable to selectively change at least one vehicle operating property.

The secondary actuation system includes at least one actuator device operatively connected to the structure at a first end and the at least one suspension corner assembly at a second end to selectively change at least one vehicle operating property. A spring assembly is in fluid communication with the at least one actuator device and is selectively actuated to adjust an amount of fluid in the at least one actuator device to selectively change the at least one vehicle operating property. The at least one suspension corner assembly further comprises a knuckle configured to support the wheel that is operatively connected to the structure via a first suspension link and a second suspension link and a damper assembly operatively connected to the knuckle and the structure to dampen forces generated at the wheel as the vehicle traverses the road surface.

The spring assembly further comprises a housing, at least one resilient member disposed within the housing adjustable between a first position and one or more second positions, a first channel extending at least partially through an interior of the spring assembly housing and a second channel arrangement configured to cooperate and receive the at least one resilient member when the at least one resilient member is adjusted to the one or more second positions. A preload mechanism extends through the first channel and is operably connected to the at least one resilient member to selectively adjust the at least one resilient member between the first position and one or more second positions to change the at least one vehicle operating property.

A locking mechanism cooperates with and engages the at least one resilient member to create an increased rate in the secondary actuation system by locking out part of the at least one resilient member. The at least one resilient member further comprises a spring medium including but not limited to coil spring, a wave spring, an accordion spring, a pneumatic spring and an elastomeric member. The adjustable at least one vehicle operating property is selected from the group consisting of variable rate stiffness, preload ride height and preload compensation of load of the spring assembly.

In yet another embodiment of the disclosure, a secondary actuation system for use with a suspension system of a vehicle operable to selectively change at least one vehicle operating property comprises at least one actuator device securable to a portion of the vehicle. The at least one actuator defines a chamber receiving a fluid and a piston disposed inside the chamber to divide the chamber into a first chamber portion and a second chamber portion. The piston is selectively movable inside the chamber along an axis to selectively change the at least one vehicle operating property.

A spring assembly is in fluid communication with the at least one actuator device to selectively change the at least one vehicle operating property. The spring assembly includes a housing, at least one resilient member disposed within the housing adjustable between a first position and one or more second positions and a first channel centrally located in and extending at least partially through an interior of the spring assembly housing. A second channel arrangement is configured to cooperate and receive the at least one resilient member when the at least one resilient member is positioned to the one or more second positions. A preload mechanism extends through the first channel and is operably connected to the at least one resilient member to selectively adjust the at least one resilient member between the first position and the one or more second positions to change the at least one vehicle operating property.

A locking mechanism cooperates with and engages the at least one resilient member to create an increased rate in the secondary actuation system by locking out part of the at least one resilient member. The at least one resilient member further comprises a spring medium including but not limited to coil spring, a wave spring, an accordion spring, a pneumatic spring and an elastomeric member. The adjustable at least one vehicle operating property is selected from the group consisting of variable rate stiffness, preload ride height and preload compensation of load of the spring assembly.

The above features and advantages, and other features and advantages, of the present disclosure are readily apparent from the following detailed description of some of the best modes and other embodiments for carrying out the disclosure, as defined in the appended claims, when taken in connection with the accompanying drawings.

BRIEF DESCRIPTION OF THE DRAWINGS

FIG. 4 is a schematic illustration of the secondary actuation system for the suspension system for a vehicle;

FIG. 5 is a schematic view of a spring assembly for use in the secondary actuation system;

FIG. 6 is a schematic view of the spring assembly in a first or open position; and FIG. 7 is a schematic view of the spring assembly in at least one second or compressed position.

DETAILED DESCRIPTION

Figure 1:
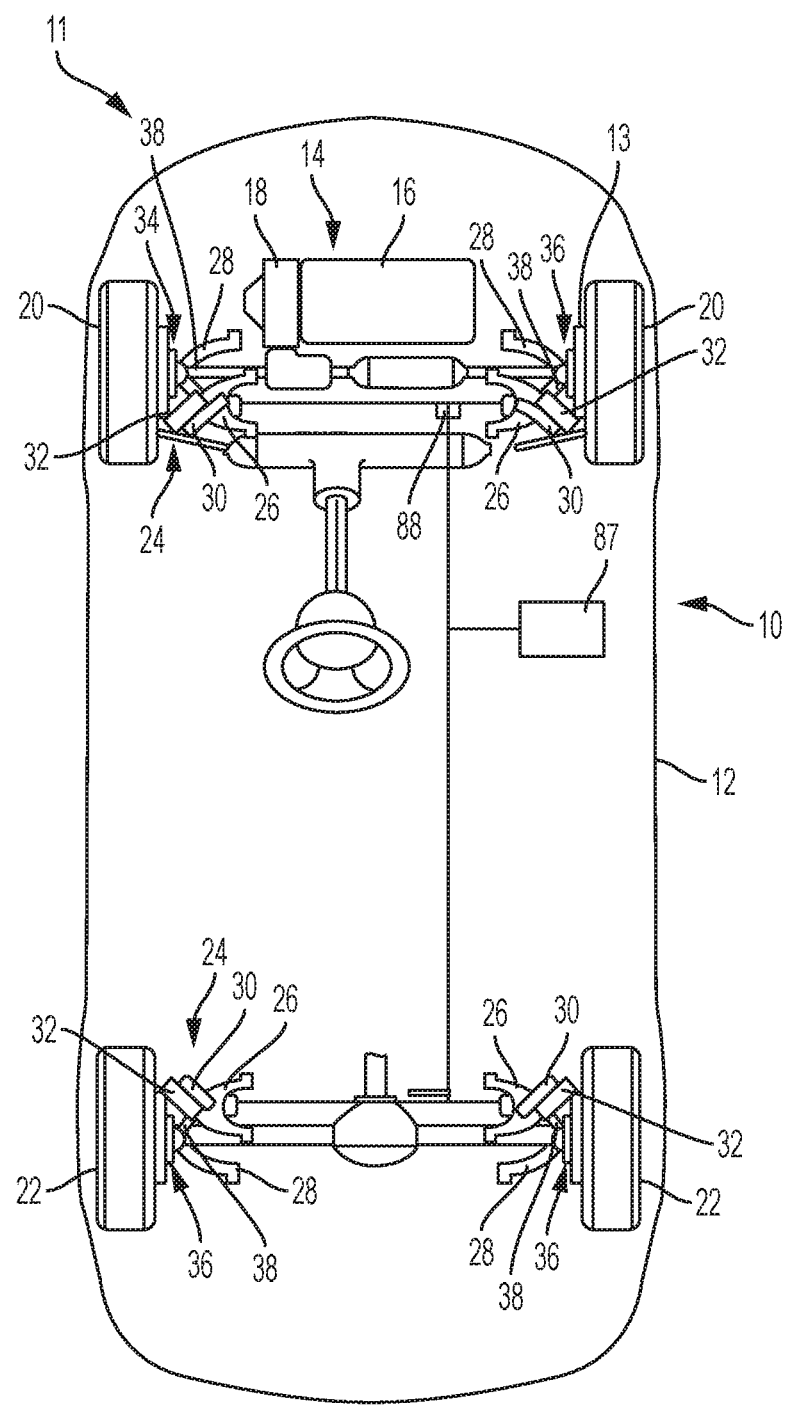
FIG. 1 is a plan view of a motor vehicle having a suspension system according to the disclosure.
Figure 2:
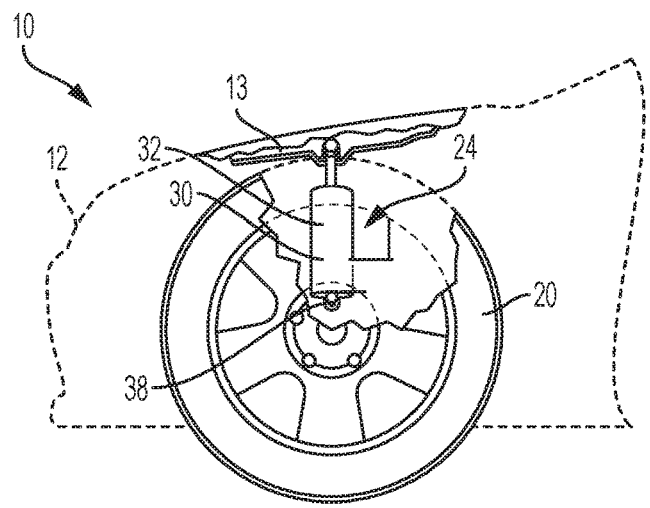
FIG. 2 is a schematic illustration in fragmentary side view of a portion of a vehicle showing a vehicle tire and wheel assembly and the suspension system with the tire and wheel assembly partially shown in phantom.

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Referring to the drawings, wherein like reference numbers correspond to like or similar components throughout the several Figures, FIG. 1 shows a schematic view of a motor vehicle 10, which includes a vehicle body 12. The vehicle 10 can be an automotive vehicle, such as, a car, a sports car, a truck, etc. Furthermore, the vehicle 10 can be a hybrid vehicle utilizing an internal combustion engine and one or more motor-generators. Additionally, the vehicle 10 can be an electric vehicle utilizing one or more motor-generators and eliminating the internal combustion engine. As another example, the vehicle 10 can be a vehicle utilizing the internal combustion engine and eliminating the motor-generator(s). It is to be appreciated that the vehicle 10 can alternatively be a non-automotive vehicle.

The vehicle 10 includes a powertrain 14 configured to propel the vehicle. As shown in FIG. 1, the powertrain 14 includes an engine 16 and a transmission 18. The powertrain 14 may also include one or more motor/generators and a fuel cell, neither of which are shown, but a powertrain configuration employing such devices would be appreciated by those skilled in the art.

The vehicle 10 also includes a plurality of road wheels that include front wheels 20 and rear wheels 22. Although four wheels, i.e., a pair of front wheels 20 and a pair of rear wheels 22, are shown in FIG. 1, a vehicle with fewer or greater number of wheels is also envisioned. A vehicle suspension system 24 operatively connects a structure 13 of the vehicle body 12 to the front and rear wheels 20, 22 for maintaining contact between the wheels 20, 22 and a road surface 11, and for maintaining handling of the vehicle 10. The structure 13 can be any component of a sprung mass of the vehicle 10, including the body, the frame, the subframe, the chassis, the outer skin, or any load-bearing component which is supported by the suspension system 24.

The suspension system 24 dampens movement of the structure 13 as the vehicle 10 travels over the road surface 11 to provide a smoother ride. Further, the suspension system 24 may provide control and damping to the unsprung masses in the suspension system 24 relative to the vehicle body 12. The suspension system 24 can be adjusted to change the stiffness of the ride of the vehicle 10 by adjusting a spring rate of the suspension system 24. In addition, the suspension system 24 can adjust the height of the vehicle by repositioning the structure 13 toward or away from the road surface 11 by adjusting a preload of the suspension system 24.

The suspension system 24 may at include least one corner suspension assembly 34 that includes a first suspension link 26 and a second suspension link 28. It is contemplated that the first suspension link 26 may be a first suspension link 26 while the second suspension link 28 may be a second suspension link 28. However, it is understood that the at least one corner suspension assembly 34 may be connected to either suspension link 26, 28 and may be connected via alternate links or in a parallel relationship.

Suspension system 24 may further include a shock absorber or damper assembly 30, and a spring 32 connected to each of the front and rear wheels 20, 22. For purposes of clarity, the configuration will be referenced to as a suspension corner generally referenced by numerals 34 and 36. The suspension system 24 includes a plurality of knuckles 38, each configured to support a respective road wheel 20, 22 via a wheel hub and bearing assembly (not shown). Each knuckle 38 may be operatively connected to the structure 13 of the vehicle body 12 via the first suspension link 26 and the second suspension link 28, and have its motion in response to road input controlled by the one or more or a combination of a shock absorber or damper assembly 30, spring 32 and/or a strut. The damper assembly 30 assembly may be configured to cushion or dampen forces being generated at the wheels 20, 22 as the vehicle 10 traverses the road surface 11.

In certain embodiments, the damper assembly 30 can cooperate with the structure 13 in various orientations, some of which can be referred to as a short long arm (SLA) suspension, a solid axle suspension, a multi-link suspension, compound crank suspension, struts, or any suitable suspension system 24 arrangement. The damper assembly 30 can be coupled or attached to the knuckle 38 and the structure 13 in suspension arrangements such as the SLA suspension, the solid axle suspension, the multi-link suspension, struts, etc.

Figure 3:
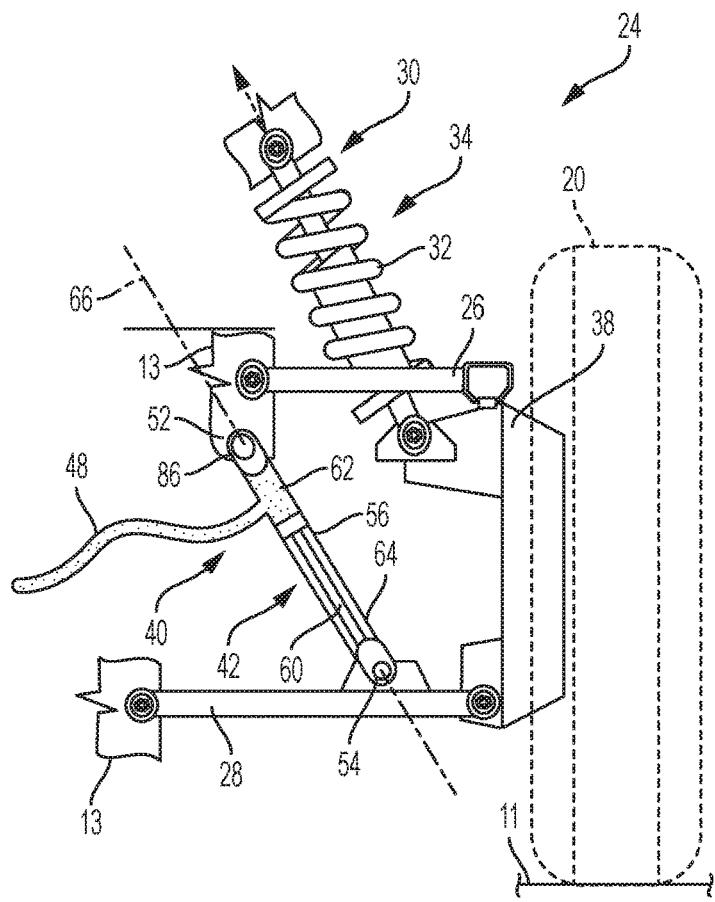
FIG. 3 is a schematic fragmentary side view of a vehicle wheel with the suspension corner and a secondary actuation system coupled to the vehicle.

Referring now to FIG. 3, the damper assembly 30 is packaged between the wheel 20 and the structure 13 of the vehicle 10. The features of the damper assembly 30 are configured to provide compact packaging of the damper assembly 30 to minimize the space utilized between the wheel 20 and the structure 13 of the vehicle body 12. The damper assembly 30 can optionally include a coil spring 32. The coil spring 32 can be in any suitable location when utilized. The coil spring 32 can surround the housing of the damper assembly 30 in certain embodiments. In other configurations, the coil spring 32 does not surround the housing of the damper assembly 30.

The damper assembly 30 enables active or adaptive control of preload, spring rate, and ride height as described herein and may be secured to a nonrotating hub portion of a tire and wheel assembly of the vehicle 10. When the vehicle 10 travels over a road, forces due to an uneven road surface, can be dampened by the damper assembly 30 to substantially dissipate the energy without excess transmission of road forces to the vehicle body 12, ensuring a smooth ride for vehicle occupants.

Referring now to FIGS. 3 and 4, the vehicle 10, and more specifically, the suspension system 24 includes a secondary actuation system, generally referenced by numeral 40, which cooperates with and may operate independently of or in parallel with the suspension system 24. Secondary actuation system 40 includes at least one actuator device 42 cooperating with and secured to one or more of the suspension corners 34, 36 to adjust one or more vehicle operating properties, including, but not limited to, spring rate and/or the preload of the suspension system 24 and/or height of the vehicle 10.

Generally, the at least one actuator device 42 includes a pair of opposing actuator devices 42, 44 that are coupled to the suspension corner assemblies 34, 36 between left and right sides of the vehicle 10. Actuator devices 42, 44 are in fluid communication with a spring assembly 46 through fluid transmission lines 48, 50. The secondary actuation system 40 may be operable to selectively change at least one vehicle operating property, such as changing the spring rate to adjust stiffness, changing the preload to adjust the downward load, and/or changing the preload to reposition the structure 13 toward or away from the road surface 11. It is contemplated that the at least one actuator 42 of secondary actuation system 40 can selectively change both of the first spring rate and the preload simultaneously.

Referring back to FIG. 3, the at least one actuator device 42 is operable in a parallel relationship with the suspension system 24. As illustrated in FIG. 3, the at least one actuator device 42 may be secured at a first end 52 to a portion of the vehicle structure 13 and a second end 54 securable to a portion of the suspension corner 34, such as the second suspension link 28 or knuckles 38. The at least one actuator device 42 may generate a spring rate which may be substantially the same as the spring rate generated by damper assembly 30.

The spring rate of the at least one actuator device 42 can be adjusted to the spring rate of the damper assembly 30 while the spring rate of the damper assembly 30 remains substantially the same when the spring rate of the at least one actuator device 42 is changed. It is understood that the spring rate of spring assembly 46 could be sufficient to replace traditional spring in damper assembly 30. Additionally, the at least one actuator device 42 can be utilized to maintain the height of the vehicle structure 13 relative to the road surface 11 such that the secondary actuation system 40 can adjust heave (up/down) motion of the vehicle 10, and more specifically heave (up/down) of the structure 13.

Referring to FIGS. 3 and 4, a further description of the secondary actuation system 40 and at least one actuator device 42 is provided. Each of the at least one actuator devices 42, 44 defines a chamber 58 therein. As is shown in the Figures, chamber 58 may be defined as a cylinder 56 having a piston 60 disposed inside the chamber 58. However, it is understood that the chamber may be configured with a variety of geometries and sizes to accomplish the objectives of the disclosure. Piston 60 may divide the chamber 58 into a first chamber portion 62 and a second chamber portion 64.

The piston 60 is selectively movable inside the chamber 58 along an axis 66 to correspondingly change sizes of the first and second chamber portions 62, 64, which can thereby selectively change the preload of the at least one actuator device 42. Generally, a fluid, generally referenced by numeral 68, is disposed in the chamber 58. When additional fluid 68 is injected or removed from the first and second chamber portions 62, 64, the piston 60 moves accordingly. The piston 60 reacts to hydraulically transferred loads via a spring medium 72 that can have different characteristics and operating conditions.

For example, when fluid 68 is injected into the first chamber portion 62 and fluid is removed from the second chamber portion 64, the piston 60 moves inside the chamber 58 which causes the first chamber portion 62 to increase in size and the second chamber portion 64 to decrease in size. As another example, when the fluid is removed from the first chamber portion 62, the piston 60 again moves inside the chamber 58 which causes the second chamber portion 64 to increase in size and the first chamber portion 62 to decrease in size.

The fluid 68 can be a liquid fluid or a gaseous fluid. Examples of suitable liquid fluids are oil, hydraulic fluid, etc. The at least one actuator device 42 utilizes a small amount of fluid to selectively change at least one vehicle operating property, such as the stiffness of the secondary actuation system 40 of suspension system 24 and/or the height of the structure 13 of the vehicle 10.

Referring now to FIGS. 4-7, the spring assembly 46 of the secondary actuation system 40 is described in greater detail. Spring assembly 46 includes a housing 70 configured to receive at least one resilient member 72. In one embodiment of the disclosure, the at least one resilient member 72 comprises a plurality of shim discs disposed within chamber 58. Alternatively, the at least one resilient member 72 may comprise a spring medium from the group including, but not limited to, a coil spring, a wave spring, an accordion spring, a pneumatic spring and an elastomeric member or the like.

Housing 70 may be formed in a variety of configurations and geometries. As illustrated in FIGS. 5-7, the at least one resilient member 72 includes a series of spaced apart stacks of shim discs that may be adjusted between a first or free position illustrated in FIG. 6 and one or more second or compressed positions as illustrated in FIG. 7 to generate a combined rate in an accordion spring arrangement. The plurality of shim discs of the at least one resilient member 72 may be formed with a shallow conical taper that may be optimized and used to provide precise tolerance for spring rates for a progressive transition and rate control. It is understood that the accordion spring arrangement of the plurality of shim discs may be used in a vehicle suspension arrangement as illustrated herein. However, the accordion spring mechanism may be used in other non-automotive capacities.

One or more channels 74, 76 are provided in the housing 70 of the spring assembly 46. Channels 74, 76 cooperate with the at least one resilient member 72 and fluid 68 provided therein. A first channel 74 may be centrally located and extend at least partially through the interior of housing 70. A preload mechanism 78 extends through the channel 74. Preload mechanism 78 may include a first end 80 disposed adjacent an end portion of the spring assembly housing 70 and a second end 82 cooperating with a locking mechanism 84 disposed within housing 70.

In one embodiment of the disclosure, locking mechanism 84 cooperates with and engages with one or more of the at least one resilient members 72 to selectively adjust at least one vehicle operating property. A variety of vehicle operating properties may be effected and/or controlled, including, but not limited to, variable rate stiffness, preload ride height and preload compensation of load of the spring assembly. Locking mechanism 84 may be actuated to create an increased rate in the secondary actuation system 40 by locking out part of the at least one resilient member 72. Alternatively, the at least one resilient member 72 may be preloaded or unloaded to vary the height when the locking mechanism 84 is placed in a locked position.

A second channel arrangement 76 is provided in the housing 70 and is configured to cooperate with the at least one resilient member 72. As shown in FIG. 6, the series of spaced apart stacks of shim discs of the at least one resilient member 72 extend generally radially outward into channels 76 relative to the channel 74 in the first or free position. When the series of spaced apart stacks of shim discs of the at least one resilient member 72 are compressed in the at least one second position shown in FIG. 7, the shim discs generally align into the profile of the channels 76 to force fluid 68 from the channels 76 into one or more of the at least one actuator devices 42 to selectively change at least one vehicle operating property. In this arrangement, the spring assembly may be considered a hydromechanical spring, though alternate configurations of the spring are possible, including wave springs, coil springs, elastomers and pneumatic arrangements and the like. However, it is understood that the objectives of this disclosure may be accomplished using a hydropneumatic spring arrangement.

Referring back to FIG. 4, spring assembly 46 is in fluid communication with the at least one actuator devices 42, 44 through fluid transmission lines 48, 50 such that fluid 68 from the spring assembly housing 70 may flow into the chambers 58 of one or more of the at least one actuator devices 42, 44 such that the chamber 58 and the spring assembly housing 70 have liquid fluid 68 therein at all times. Increasing pressure in one of the first and second chamber portions 62, 64 and decreasing pressure in the other one of the first and second chamber portions 62, 64 can increase the preload of the secondary actuation system 40. The at least one actuator device 42 can change the stiffness of the suspension system 24, in conjunction with or without, changing the height of the structure 13 relative to the road surface 11.

In one of the embodiments of the disclosure, the secondary actuation system 40 may actuate a single actuation device 42 at a corner suspension to adjust a vehicle operating property such as variable rate stiffness or preload ride height or load compression at that corner suspension. Alternatively, actuation devices 42, 44 may be disposed opposite each other on the vehicle 10 and operate simultaneously to provide a "heave" control to adjust one of the vehicle operating properties. The system can also be coupled cross car to enable cross car damping via inline porting. The system can also be integrated as a system to control all four corners or wheels of the vehicle collectively for pitch, roll, heave rate adjustment and damping in roll and pitch.

The system can be integrated to enable adjustment of operating parameters such as variable rate stiffness and preload for ride height adjustment or load compensation via manual or automated means. Automated systems may use controls to allow an optimized solution or provide a user or driver selectable adjustment feature. One or more sensors including pressure, position, velocity and acceleration sensors may be coupled with and used in the tuning, optimization and control of the system.

In yet another embodiment of the disclosure, secondary actuation system 40 may allow the fluid 68 in the system 40 to flow without restriction between the actuation devices 42, 44 through the use of an inline valve (not shown) for damping between actuators for corner, roll or pitch motions. The valve may be passive or adjustable, and also may be in electrical communication with a controller 87 for adaptive control of the valve or the system 40 may be passively tuned for performance.

The at least one actuator device 42 may include a rod 86 having a first end attached to the piston 60 and extending from the first end 52 of the at least one actuator device 42 and a second end connected to the structure 13. Movement of the piston 60 causes more or less of the rod 86 to be disposed in the chamber 58 based upon an adjustment in the fluid level in the chamber 58. For example, to move the structure 13 toward the road surface 11, additional liquid fluid 68 is injected into the first chamber portion 62 while some liquid fluid 68 is expelled out of the second chamber portion 64 which causes the piston 60 to move in the chamber 58 toward the second end 54 of the at least one actuator device 42.

When the at least one actuator device 42 is being utilized to raise the structure 13 away from the road surface to increase clearance between the structure 13 and the road surface 11, the preload of the secondary actuation system 40 can be increased. To move the structure 13 away from the road surface 11, additional liquid fluid 68 is injected into the second chamber portion 64 while some liquid fluid 68 is expelled out of the first chamber portion 62 which causes the piston 60 to move in the chamber 58 toward the first end 52 of the at least one actuator device 42, thereby adjusting rod 86 to raise the structure 13 away from the road surface 11.

Referring back to FIG. 1, the secondary actuation system 40 of vehicle 10 may also include a pump to deliver or feed the liquid fluid 68 to the chamber 58 and a controller 87 in electrical communication with the pump to control delivery of the liquid fluid to the chamber 58. In certain embodiments, the pump can be an oil or hydraulic pump. Additionally, the vehicle 10 can include one or more valves 88 in electrical communication with the controller 87. Furthermore, the valves 88 can also be in fluid communication with the chamber 58 of the at least one actuator device 42, 44 and the pump. For example, one of the valves can be in fluid communication with the pump and the first chamber portion 62. The valves 88 can selectively open and close to selectively allow liquid fluid 68 to move therethrough. Therefore, the pump and the valves 88 cooperate to provide the desired amount of liquid fluid inside the chamber 58. The controller 87 electrically communicates with the pump and the valves 88 to control movement of the liquid fluid 68 in and out of the chamber 58.

As suggested above, the controller 87 can be in electrical communication with the at least one actuator device 42, 44. The controller 87 can control the at least one actuator device 42, 44 to move the piston 60 to a desired position to position the structure 13 in the desired distance from the road surface 11 and/or to provide the desired stiffness for the suspension system 24. The controller 87 can be part of an electronic control module, e.g., an engine control module. The controller 87 includes a processor and a memory on which is recorded instructions for controlling the components of the suspension system 24, secondary actuation system 40 and vehicle 10. The controller 87 can control other components of the vehicle 10 not specifically discussed herein and/or be in electrical communication with another controller of the vehicle 10.

The controller 87 is configured to execute the instructions from the memory via the processor. For example, the controller 87 can be a host machine or distributed system, e.g., a computer such as a digital computer or microcomputer, acting as a vehicle 10 control module, and/or as a proportional-integral-derivative (PID) controller device having a processor, and, as the memory, tangible, non-transitory computer-readable memory such as read-only memory (ROM) or flash memory. The controller 87 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry.

Therefore, the controller 87 can include all software, hardware, memory, algorithms, connections, sensors, etc., necessary to control the suspension system 24 and secondary actuation system 40. As such, a control method operative to control the suspension system 24 and secondary actuation system 40 can be embodied as software or firmware associated with the controller 87. It is to be appreciated that the controller 87 can also include any device capable of analyzing data from various sensors, comparing data, making the necessary decisions required to control and monitor the suspension system 24 and secondary actuation system 40. It is to also be appreciated that more than one controller 87 can be utilized to control the components discussed above.

The at least one actuator device 42 can be actuated automatically or manually to adjust the height of the structure 13 relative to the road surface 11 and/or the preload and/or to adjust the stiffness of the suspension system 24. For example, one or more buttons can be disposed inside a passenger compartment of the vehicle 10 which can be manually actuated. The button(s) can be pushed, rotated, etc. As another example, as the vehicle 10 changes speed, the controller 87 can be in electrical communication with a speed sensor to automatically adjust the height of the structure 13 relative to the road surface 11 and/or to adjust the stiffness of the suspension system 24 in relation to the speed that the vehicle 10 is travelling. The controller 87 can be utilized to automatically control the at least one actuator device 42.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
   a structure;
   a wheel configured to maintain contact with a road surface;
   a suspension system supporting the structure, the suspension system including at least one suspension corner assembly connecting the wheel to the structure and configured to maintain contact between the wheel and the road surface; and
   a secondary actuation system cooperating with the suspension system and operable to selectively change at least one vehicle operating property, wherein the secondary actuation system includes:
   at least one actuator device operatively connected to the structure at a first end and the at least one suspension corner assembly at a second end to selectively change at least one vehicle operating property, wherein the at least one actuator device defines a chamber receiving a fluid and has a piston disposed inside the chamber to divide the chamber into a first chamber portion and a second chamber portion, wherein the piston is selectively movable inside the chamber along an axis to selectively change the at least one vehicle operating property, and a spring assembly in fluid communication with the at least one actuator device and selectively actuated to adjust an amount of fluid in the at least one actuator device to selectively change the at least one vehicle operating property, wherein the spring assembly further comprises:

a housing, at least one resilient member disposed within the housing adjustable between a first position and one or more second positions, a first channel defined by the housing extending at least partially through an interior of the spring assembly housing, a second channel arrangement defined by the housing and configured to cooperate and receive the at least one resilient member when the at least one resilient member is adjusted to the one or more second positions, and a preload mechanism extending through the first channel and operably connected to the at least one resilient member to selectively adjust the at least one resilient member between the first position and one or more second positions to change the at least one vehicle operating property.

2. The vehicle of claim 1 wherein the at least one suspension corner assembly further comprises a knuckle configured to support the wheel operatively connected to the structure via at least a first suspension link, a second suspension link and a damper assembly operatively connected to the knuckle and the structure to dampen forces generated at the wheel as the vehicle traverses the road surface.

3. The vehicle of claim 1 wherein the at least one actuator defines a chamber receiving the fluid and a piston disposed inside the chamber to divide the chamber into a first chamber portion and a second chamber portion, wherein the piston is selectively movable inside the chamber along an axis to selectively change the at least one vehicle operating property.

4. The vehicle of claim 1 wherein the at least one resilient member further comprises a plurality of shim discs disposed in the spring assembly housing as a series of spaced apart stacks of shim discs and formed with a shallow conical taper to provide precise tolerance for suspension adjustment rate control.

5. The vehicle of claim 1 wherein the at least one resilient member further comprises a spring medium from the group consisting of a plurality of shim discs, a coil spring, a wave spring, an accordion spring and an elastomeric member.

6. The vehicle of claim 1 wherein the adjustable at least one vehicle operating property is selected from the group consisting of variable rate stiffness, preload ride height and preload compensation of load of the spring assembly.

7. A suspension system for a vehicle having a structure and a wheel configured to maintain contact with a road surface comprising:

at least one suspension corner assembly connecting the wheel to the structure and configured to maintain contact between the wheel and the road surface; and a secondary actuation system cooperating with the at least one suspension assembly and operable to selectively change at least one vehicle operating property, wherein the secondary actuation system includes:

at least one actuator device operatively connected to the structure at a first end and the at least one suspension corner assembly at a second end to selectively change at least one vehicle operating property, wherein the at least one actuator device defines a chamber receiving a fluid and has a piston disposed inside the chamber to divide the chamber into a first chamber portion and a second chamber portion, wherein the piston is selectively movable inside the chamber along an axis to selectively change the at least one vehicle operating property, and a spring assembly in fluid communication with the at least one actuator device to selectively change the at least one vehicle operating property, wherein the spring assembly further comprises:

a housing, at least one resilient member disposed within the housing adjustable between a first position and one or more second positions, a first channel defined by the housing extending at least partially through an interior of the spring assembly housing, a second channel arrangement defined by the housing and configured to cooperate and receive the at least one resilient member when the at least one resilient member is adjusted to the one or more second positions, and a preload mechanism extending through the first channel and operably connected to the at least one resilient member to selectively adjust the at least one resilient member between the first position and one or more second positions to change the at least one vehicle operating property.

8. The suspension system of claim 7 wherein the at least one suspension corner assembly further comprises a knuckle configured to support the wheel operatively connected to the structure via a first suspension link and a second suspension link and a damper assembly operatively connected to the knuckle and the structure to dampen forces generated at the wheel as the vehicle traverses the road surface.

9. The suspension system of claim 7 further comprising a locking mechanism cooperating with and engaging the at least one resilient member to create an increased rate in the secondary actuation system by locking out part of the at least one resilient member.

10. The suspension system of claim 7 wherein the at least one resilient member further comprises a spring medium, wherein the spring medium includes at least one of a coil spring, a wave spring, an accordion spring, a pneumatic spring and an elastomeric member.

11. The suspension system of claim 7 wherein the adjustable at least one vehicle operating property is selected from the group consisting of variable rate stiffness, preload ride height and preload compensation of load of the spring assembly.

12. A secondary actuation system for use with a suspension system of a vehicle operable to selectively change at least one vehicle operating property comprising:

at least one actuator device securable to a portion of the vehicle and defining a chamber receiving a fluid, with a piston disposed inside the chamber to divide the chamber into a first chamber portion and a second chamber portion, wherein the piston is selectively movable inside the chamber along an axis to selectively change the at least one vehicle operating property; and a spring assembly in fluid communication with the at least one actuator device to selectively change the at least one vehicle operating property, the spring assembly including a housing, at least one resilient member disposed within the housing adjustable between a first position and one or more second positions, a first channel centrally located in and extending at least partially through an interior of the spring assembly housing, a second channel arrangement configured to cooperate and receive the at least one resilient member when the at least one resilient member is positioned in the one or more second positions, and a preload mechanism extending through the first channel and operably connected to the at least one resilient member to selectively adjust the at least one resilient member between the first position and the one or more second positions to change the at least one vehicle operating property.

13. The secondary actuation system of claim 12 further comprising a locking mechanism cooperating with and engaging the at least one resilient member to create an increased rate or preload in the secondary actuation system by locking out part of the at least one resilient member.

14. The secondary actuation system of claim 12 wherein the at least one resilient member further comprises a spring medium, wherein the spring medium includes at least one of a coil spring, a wave spring, an accordion spring, a pneumatic spring and an elastomeric member.

15. The secondary actuation system of claim 12 wherein the adjustable at least one vehicle operating property is selected from the group consisting of variable rate stiffness, preload ride height and preload compensation of load of the spring assembly.

* * * * *